Patented Nov. 11, 1930

1,781,248

UNITED STATES PATENT OFFICE

HEINZ SCHEYER, OF RIO DE JANEIRO, BRAZIL, ASSIGNOR TO GENERAL ANILINE WORKS, INC., OF NEW YORK, N. Y., A CORPORATION OF DELAWARE

COMPOUND OF THE PYRAZOLANTHRONE SERIES AND PROCESS OF MAKING SAME

No Drawing. Application filed April 11, 1929, Serial No. 354,433, and in Germany April 5, 1928.

My present invention relates to new compounds of the pyrazolanthrone series and to a process of making the same; more particularly it relates to 2-aroyl pyrazolanthrone compounds of the following probable general formula

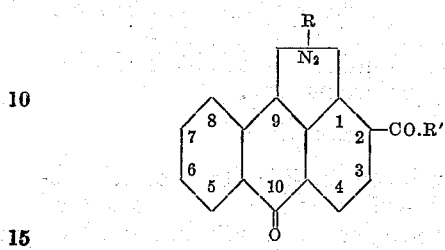

wherein R stands for hydrogen or an alkyl radicle and R' stands for a residue of an aromatic hydrocarbon which may be substituted by halogen. My new compounds are obtainable from a 1-halogen-anthraquinone-2-carboxylic acid in the following manner:

1-halogen-anthraquinone-2-carboxylic acid is at first caused to react with hydrazine, preferably while heating and in the presence of a suitable diluent such as pyridine. As an intermediate probably anthraquinone-1-hydrazine-2-carboxylic acid is formed and then ringclosure of the hydrazine group occurs, surprisingly with the ketogroup standing in the 9-position of the anthraquinone nucleus, not with the carboxylic acid group of the 2-position. The pyrazolanthrone-2-carboxylic acid thus formed is then converted into its acid chloride according to one of the usual methods and the pyrazolanthrone-2-carboxylic acid chloride is condensed with an aromatic hydrocarbon or a halogenated substitution product thereof, which compounds in the following claims are defined as "aromatic hydrocarbon compounds", in the presence of an acid condensing agent, such as aluminium or iron chloride.

The probable course of the reactions in the combined process may be illustrated by the following equations:

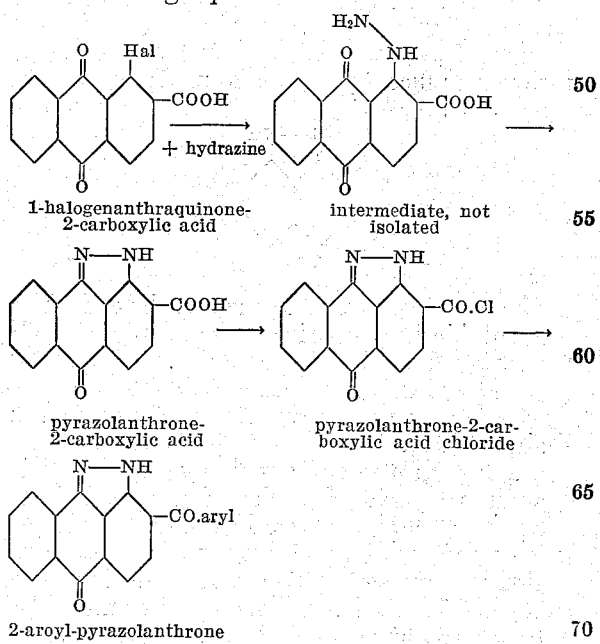

In all these formulas the anthraquinone nucleus as well as the aryl residue may contain further substituents.

The pyrazolanthrone-2-carboxylic acid may be further on alkylated or aralkylated at the nitrogen atoms of the pyrazol ring according to one of the usual methods. When converting the thus obtained compounds into the corresponding acid chlorides and condensing the latter with aromatic hydrocarbons etcetera according to the aforesaid scheme of reactions N-alkylated or aralkylated 2-aroylpyrazolanthrone derivatives are formed, which are also obtainable by a subsequent alkylation or aralkylation of the 2-aroylpyrazolanthrones.

The 2-aroyl-pyrazolanthrone compounds obtainable according to my combined process are when dry crystalline powders, soluble in concentrated sulfuric acid with a yellow to orange color, in an aqueous alcoholic caustic alkali solution with a violet color; they form with an alkaline hydrosulfite solution a reddish vat. The new compounds are important intermediates for the production of dyestuffs.

In order to further illustrate my invention the following examples are given, the parts being by weight and all temperatures in centigrade degrees; but I wish it to be understood that my invention is not limited to the examples given, nor to the exact conditions stated therein.

Example 1

14,3 parts of 1-chloro-anthraquinone-2-carboxylic acid are dissolved in 60 parts of hot dehydrated pyridine and at about 100° slowly 5 parts of hydrazine-hydrate are added, so that the liquor is feebly boiling. Already during the addition of hydrazine the condensation product separates in the form of yellow needles. The isolated reaction product corresponds probably to the formula:

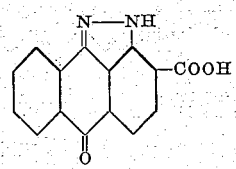

The new pyrazolanthrone-2-carboxylic acid is soluble in a solution of carbonate of soda with a yellow, in a caustic soda solution with a red color, in concentrated sulfuric acid with an orange color; its melting point is above 300°.

2,6 parts thereof are finely suspended in about 26 parts of trichlorobenzene, 4 parts of thionylchloride are added and the mixture is heated to feebly boiling until a total solution is formed. The acid chloride thus formed is freed from the solvent and added to 30 parts of toluene. To the suspension thus obtained 3 parts of finely divided aluminium chloride are added and the mass is heated while stirring to about 80° and kept at this temperature, until the evolution of hydrochloric acid has ceased. The cooled reaction mass is poured on ice, some hydrochloric acid is added and the excess of toluene is expelled by steam. The tolyl-2-pyrazolanthronylketone of the probable formula:

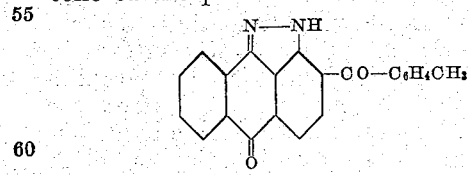

is thus obtained as a yellow powder. It may be freed from some unchanged carboxylic acid by boiling with a solution of carbonate of soda. The new ketone compound dissolves in an aqueous alcoholic caustic soda solution with an intense violet color. It is scarcely soluble in an aqueous alkali solution. The coloration of the solution in concentrated sulfuric acid is orange. After purifying the compound by one recrystallization from monochlorobenzene it shows a melting point of about 250° C.

When replacing toluene by a corresponding quantity of para-diachlorobenzene a dichloro-benzoyl-2-pyrazolanthrone of the probable formula:

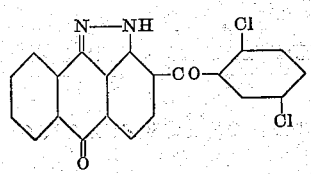

is obtained of similar properties as described above. After once recrystallizing it from monochlorobenzene it has a melting point of about 297° C. The coloration of the solution in an alcoholic caustic soda solution is somewhat more bluish violet than that of a solution of toluyl-2-pyrazolanthrone. The product derived from pyrazolanthrone-2-carboxylic acid chloride and 2.4-dichlorotoluene is very similar to that obtained when using para-dichlorobenzene.

Example 2

The pyrazolanthrone-2-carboxylic acid obtainable as described in Example 1 is treated with dimethylsulfate in an alkaline solution.

2,8 parts of N-methylpyrazolanthrone-2-carboxylic acid thus obtained are boiled after addition of 3 parts of thionylchloride and about 40 parts of toluene until a complete solution is formed. When cool the acid chloride separates in the form of fine needles. When treating this acid chloride with toluene and aluminium chloride in the manner described in Example 1 a new N-methyl-2-toluyl-pyrazolanthrone is obtained. It crystallizes from glacial acetic acid in the form of yellow needles of about 250° melting point. With an alkaline hydrosulfite solution it forms a bluish red vat dyeing cotton therefrom feeble yellow shades.

The production of the ketone compound may be also carried out without isolating the acid chloride.

The same product is obtained when treating subsequently the 2-toluylpyrazolanthrone described in Example 1 with dimethylsulfate in an alcoholic alkaline solution.

I claim:—

1. A process which comprises treating an 1-halogen-anthraquinone-2-carboxylic acid with hydrazine, converting the pyrazolanthrone-2-carboxylic acid thus formed into its chloride and condensing this chloride with an aromatic hydrocarbon compound.

2. A process which comprises treating an 1-halogen-anthraquinone-2-carboxylic acid with hydrazine, converting the pyrazolanthrone-2-carboxylic acid thus formed into its chloride and condensing this chloride with an aromatic hydrocarbon compound in the presence of a diluent.

3. A process which comprises treating an 1-halogen-anthraquinone-2-carboxylic acid with hydrazine, converting the pyrazolanthrone-2-carboxylic acid thus formed into its chloride and condensing this chloride with an aromatic hydrocarbon compound of the benzene series in the presence of a diluent.

4. As new products keto-compounds of the pyrazolanthrone series corresponding probably to the general formula:

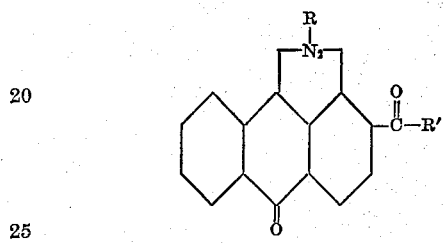

wherein R means hydrogen or alkyl and R' stands for a residue of an aromatic hydrocarbon which may be substituted by halogen.

5. As new products keto-compounds of the pyrazolanthrone series corresponding probably to the general formula:

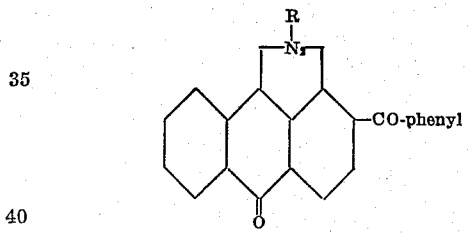

wherein R means hydrogen or alkyl.

6. As a new compound a 2-(dichlorobenzoyl)-pyrazolanthrone of the probable formula:

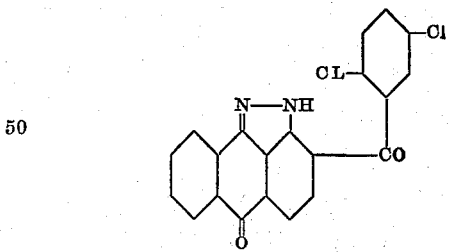

soluble in an aqueous alcoholic caustic soda solution with a bluish intense violet color, in concentrated sulfuric acid with an orange color.

In testimony whereof, I affix my signature.

HEINZ SCHEYER.